US007959885B2

(12) United States Patent
Li et al.

(10) Patent No.: US 7,959,885 B2
(45) Date of Patent: Jun. 14, 2011

(54) NANOPARTICLE SYNTHESIS BY SOLVOTHERMAL PROCESS

(75) Inventors: Sheng Li, Vista, CA (US); Jesse Dan Froehlich, Vista, CA (US); Toshitaka Nakamura, Oceanside, CA (US); Amane Mochizuki, San Diego, CA (US)

(73) Assignee: Nitto Denko Corporation, Ibaraki, Osaka (JP)

( * ) Notice: Subject to any disclaimer, the term of this patent is extended or adjusted under 35 U.S.C. 154(b) by 494 days.

(21) Appl. No.: 12/032,590

(22) Filed: Feb. 15, 2008

(65) Prior Publication Data
US 2009/0208398 A1    Aug. 20, 2009

(51) Int. Cl.
*C01F 13/00* (2006.01)

(52) U.S. Cl. ............... 423/263; 423/594.1; 423/21.1; 977/810

(58) Field of Classification Search .......... 423/263, 423/445 B, 593.1, 600, 625; 977/810
See application file for complete search history.

(56) References Cited

U.S. PATENT DOCUMENTS

| 5,401,484 A | 3/1995 | Wurmbauer et al. |
| 6,905,636 B2 | 6/2005 | Yuan et al. |

FOREIGN PATENT DOCUMENTS

JP    4-119914 A    4/1992

OTHER PUBLICATIONS

Nonaqueous Synthesis of Nanocrystalline Indium Oxide and Zinc Oxide in the Oxygen-Free Solvent Acetonitrile Jelena Buha,, Igor Djerdj,, and, Markus Niederberger, Crystal Growth & Design 2007 7 (1), 113-116.*
Solvothermal Synthesis of ZnO with Various Aspect Ratios Using Organic Solvents Siracharya Kunjara Na Ayudhya,, Parawee Tonto,, Okorn Mekasuwandumrong,,, Varong Pavarajarn, and, Piyasan Praserthdam, Crystal Growth & Design 2006 6 (11), 2446-2450.*
M. Veith, et al., "Low temperature synthesis of nanocrystalline $Y_3Al_5O_{12}$ (YAG) and Ce-doped $Y_3Al_5O_{12}$ via different sol-gel methods", Journal of Materials Chemistry, (1999) 9, 3069-3079.
S. M. Sim, et al., "Phase formation in yttrium aluminum garnet powders synthesized by chemical methods", Journal of Materials Science, (2000) 35, 713-717.
D. R. Messier, et al., "Synthesis of $MgAl_2O_4$ and $Y_3Al_5O_{12}$ by Thermal Decomposition of Hydrated Nitrate Mixtures", Am. Ceram. Soc. Bull. 51 (1972) 692.

(Continued)

*Primary Examiner* — Stuart Hendrickson
*Assistant Examiner* — Richard M Rump
(74) *Attorney, Agent, or Firm* — Knobbe, Martens, Olson & Bear, LLP

(57) ABSTRACT

A solvothermal process for making inorganic nanoparticles is described. Inorganic nanoparticles can be produced by forming a suspension or solution comprising at least one group II-IV and lanthanide metal inorganic salt in a first medium, disposing the suspension or solution in a sealed chamber having an interior pressure, elevating the interior pressure of the sealed chamber to an initial interior pressure prior to the heating, heating the suspension or solution to a peak temperature higher than the normal boiling point of the first medium, optionally adding a second medium to the suspension or solution after the heating.

28 Claims, 2 Drawing Sheets

OTHER PUBLICATIONS

K. Ohno, et al., "Effect of BaF$_2$ on the Synthesis of the Single-Phase Cubic Y$_3$Al$_5$O$_{12}$:Tb", J. Electrochem. Soc., 133 (Mar. 1986) 638.

D. Hreniak, et al., "Synthesis and optical properties of Nd$^{3+}$-doped Y$_3$Al$_5$O$_{12}$ nanoceramics", Journal of Alloys and Compounds, 341 (2002) 183-186.

G. Gowda, et al., "Synthesis of yttrium aluminates by the sol-gel process", Journal of Materials Science Letters 5 (1986) 1029-1032.

Y. Liu, et al., "Synthesis of Yttrium Aluminum Garnet from Yttrium and Aluminum Isobutyrate Precursors", J. Am. Ceram. Soc. 79 (2) (1996) 385-394.

B. V. Mill, et al., "Hydrothermal Synthesis of Aluminum and Gallium Garnets", Soviet Physics-Crystallography, (English Translation), (1967) 12 (1) 137-139.

R. C. Puttbach, et al., "Hydrothermal Growth of Y$_3$Al$_5$O$_{12}$" pp. 569-571 in Crystal Growth, Proceedings of the International Conference on Crystal Growth (Boston, MA, 1966). Edited by H. S. Peiser. Pergamon Press, Oxford, U. K., 1967.

E. D. Kolb, et al., "Phase Equilibria of Y$_3$Al$_5$O$_{12}$, Hydrothermal Growth of Gd$_3$Ga$_5$O$_{12}$ and Hydrothermal Epitaxy of Magnetic Garnets", Journal of Crystal Growth, 29 (1975)[I] 29-39.

T. Takamori, et al., "Controlled Nucleation for Hydrothermal Growth of Yttrium-Aluminum Garnet Powders", Am. Ceram. Soc. Bull., 65[9] 1282-86 (1986).

M. Inoue, et al., "Thermal Reaction of Aluminum Alkoxide in Glycols", J. Am. Ceram. Soc., 73 [4] 1100-102 (1990).

M. Inoue, et al., "Synthesis of Yttrium Aluminum Garnet by the Glycothermal Method", J. Am. Ceram. Soc., 74 [6] 1452-54 (1991).

M. Inoue, et al., "Reaction of Aluminum Alkoxides with Various Glycols and the Layer Structure of Their Products", J. Chem. Soc. Dalton Trans. 3331-3336 (1991).

M. Inoue, et al., "Glycothermal Synthesis of rare earth aluminum garnets", Journal of Alloys and Compounds (1995), 226, 146-151.

Y. Hakuta, et al., "Production of phosphor (YAG:Tb) fine particles by hydrothermal synthesis in supercritical water", Journal of Materials Chemistry (1999), 9, 2671-2674.

X. Zhang, et al., "Synthesis of monodisperse and spherical YAG nanopowder by a mixed solvothermal method", Journal of Alloys and Compounds 372 (2004), 300-303.

R. Kasuya, et al., "Photoluminescence Enhancement of PEG-Modified YAG:Ce$^{3+}$Nanocrystal Phosphor Prepared by Glycothermal Method", J. Phys. Chem. B (2005), 109, 22126-22130.

R. Kasuya, et al., "Glycothermal synthesis and photoluminescence of YAG:Ce$^{3+}$nanophosphors", Journal of Alloys and Compounds 408-412 (2006), 820-823.

Hosokawa, et al., "Defect structure of rare earth aluminium garnets obtained by the glycothermal method." Journal of Alloys and Compounds, (2007).

International Search Report and Written Opinion in PCT/US2009/033689, dated June 16, 2010.

Inoue, "Glycothermal Synthesis of Metal Oxides" Journal of Physics: Condensed Matter, Institute of Physics Publishing, Bristol, GB, vol. 16, No. 14, Apr. 14, 2004, pp. S1291-S1303, XP020059410, ISSN: 0953-8984.

Kasuya, et al., "Characteristic optical properties of transparent color conversion film prepared from YAG:Ce3+ nanoparticles", Applied Physics Letters, Sep. 14, 2007, vol. 91, Issue 11, pp. 111916.

* cited by examiner

NANOPARTICLE SYNTHESIS BY SOLVOTHERMAL PROCESS

BACKGROUND OF THE INVENTION

1. Field of the Invention

This invention relates to the solvothermal synthesis of yttrium aluminium garnet (YAG). Specifically, this invention relates to a cost effective and novel means of producing high yields of nano-sized (<30 nm) YAG particles via a solvothermal synthesis process.

2. Description of the Related Art

Yttrium aluminum garnet ($Y_3Al_5O_{12}$), or YAG, has many potential commercial applications due to its good optical properties.[1-2] $Ce^{3+}$-doped YAG phosphor ($Ce^{3+}$-YAG), combined with blue light emitting diode (LED), is widely used for the white solid state LED.

There are several methods to synthesize YAG particles. For example, the conventional solid-state reaction[2-4] is a fairly simple process, but it typically requires high temperature (>1,600° C.) and long reaction time. Furthermore, the YAG particles produced by this method tend to be larger than about 1 μm. The sol-gel method[5-7] makes YAG by direct crystallization from amorphous precursor at a lower temperature (~700° C.), but it requires a more complicated process and an additional thermal treatment at high temperature (>800° C.). The hydrothermal synthesis[8-11] also typically requires both high temperature (>400° C.) and high pressure (>30 MPa) to overcome the supercritical condition of water (Tc=374° C., Pc=22.4 MPa).

The organic solvothermal process[12-13] has also been used to synthesize YAG powder at lower temperature and pressure. The YAG powder synthesized by the earlier method consists of the aggregates of irregular grains. Although the later solvothermal process[14-18] was capable of making monodispersed spherical YAG powder, it still lacked the ability to synthesize $Ce^{3+}$-doped YAG phosphor at low temperature. Recently, a glycothermal method[18-19] has been developed to synthesize $Ce^{3+}$-doped YAG Nano-phosphors, and the method incorporates a luminescent cerium center into YAG nanoparticles without post heat treatment at high temperatures. However, the glycothermal process affords little control of the inner pressure, along with low recovery ceramic yield and relatively low internal quantum efficiency (IQE).

The embodiments of present invention are directed to an improved solvothermal method for making inorganic nanoparticles that not only allows the interior pressure to be preset prior to the reaction as well as to be adjusted freely throughout the reaction, but also dramatically simplifies the work-up process with high recovery yield. The present invention also makes nanometer sized YAG particles with high internal quantum efficiency (IQE) value.

REFERENCES

1. M. Veith, S. Mathur, A. Kareiva, M. Jilari, M. Zimmer, V. Huch, *J. Mater. Chem.*, 9, 3069, 1999.
2. S. M. Sim, K. A. Keller, *J. Mater. Sci.*, 35, 713, 2000.
3. D. R. Messier, G. E. Gazza, *Am. Ceram. Soc. Bull.* 51 (1972) 692.
4. K. Ohno and T. Abe, *J. Electrochem. Soc.*, 1986, 133, 638.
5. D. Hreniak, W. Strek, *J. Alloys Compd.* 341 (2002) 183.
6. G. Gowda, *J. Mater. Sci. Lett.* 5 (1986) 1029.
7. Y. Liu, Z. F. Zhang, B. King, J. Halloran, R. M. Laine, *J. Am. Ceram. Soc.* 79 (1996) 385.
8. B. V. Mill, Sov. *Php-Crystallogr.* (EngI. Transl.), I2 [1] 137-35, (1969).
9. R. C. Puttbach, R. R. Monchamp, and J. W. Nielsen, "Hydrothermal Growth of Y3Al5O"; pp. 569-71 in Crystal Growth, Proceedings of the International Conference on Crystal Growth (Boston, Mass., 1966). Edited by H. S. Peiser. Pergamon Press, Oxford, U. K., 1967.
10. E. D. Kolb and R. A. Laudise, *J. Cryst. Growth*, 29 [I] 29-39 (1975).
11. T. Takamori and L. D. David, *Am. Ceram. SUC. Bull.*, 65[9] 1282-86 (1986).
12. M. Inoue, H. Kominami, and T. Inui, *J. Am. Ceram. Soc.*, 73 [4] 1100-02 (1990).
13. M. Inoue, H. Otsu, H. Kominami, and T. Inui, *J. Am. Ceram. Soc.*, 74 [6] 1452-54 (1991).
14. M. Inoue, H. Kominami, and T. Inui, *J. Chem. Soc. Dalton Trans.* 3331-3336 (1991).
15. M. Inoue, H. Otsu, H. Kominami, T. Inui, *J. Alloys Compd.* 1995, 226, 146-151.
16. Y. Hakuta, K. Seino, H. Ura, T. Adschiri, H. Takizawa, and K. Aari, *J. Mater. Chem.* 1999, 9, 2671-2674.
17. X. Zhang, H. Liu, W. He, J. Wang, X. Li, R. Boughton, *J. Alloys Compd.* 2004, 372, 300-303.
18. R. Kasuya, T. Isobe, H. Kuma, and J. Katano, *J. Phys. Chem. B* 2005, 109, 22126-22130.
19. R. Kasuya, T. Isobe, and H. Kuma, *J. Alloys Compd.* 2006, 408-412, 820-823.

SUMMARY OF THE INVENTION

One embodiment provides a solvothermal process for making inorganic nanoparticles, comprising forming a suspension or solution comprising at least one group II-IV and lanthanide metal inorganic salt in a first medium, disposing the suspension or solution in a sealed chamber having an interior pressure, heating the suspension or solution to a peak temperature higher than the normal boiling point of the first medium, elevating the interior pressure of the sealed chamber to an initial interior pressure prior to the heating, optionally adding a second medium to the suspension or solution after the heating, and forming a plurality of inorganic nanoparticles, wherein 80% of the plurality of inorganic nanoparticles has a diameter less than 100 nm.

Another embodiment provides a solvothermal process for making yttrium aluminum garnet (YAG) nanoparticles, comprising forming a suspension or solution comprising a at least one group II-IV and lanthanide metal inorganic salt in a first medium, disposing the suspension or solution in a sealed chamber having an initial interior pressure that is higher than the atmospheric pressure, heating the suspension or solution in the sealed chamber to a peak temperature higher than the normal boiling point of the first medium, and precipitating the YAG nanoparticles. Another embodiment provides a plurality of $Ce^{3+}$-YAG nanoparticles produced by such solvothermal process.

One embodiment provides an optical film capable of converting blue light to yellow light, comprising a layer of YAG nanoparticles, wherein the layer of YAG nanoparticles has a size distribution of between about 2 nm to about 200 nm. Another embodiment provides a white light emitting device comprising at least one such optical film.

One embodiment provides A white light emitting device comprising a light source capable of emitting blue light, and a $Ce^{3+}$-YAG phosphor comprising $Ce^{3+}$-YAG nanoparticles having a size distribution of between about 2 nm to about 200 nm.

DETAILED DESCRIPTION OF THE PREFERRED EMBODIMENT

Although certain preferred embodiments and examples are disclosed below, it will be understood by those skilled in the art that the invention extends beyond the specifically disclosed embodiments and/or uses of the invention and obvious modifications and equivalents thereof. Thus, it is intended that the scope of the invention herein disclosed should not be limited by the particular disclosed embodiments described below.

Cerium-doped yttrium aluminum garnet ($Ce^{3+}$-YAG) is used as a phosphor and a scintillator. It emits yellow light when subject to blue or ultraviolet light, or x-ray. It is also used in white light-emitting diodes as it is capable of covert blue light into yellow, which appears as white. Although $Ce^{3+}$-YAG may be made in many different ways, the reaction conditions are generally harsh for many syntheses. A low temperature solvothermal method for synthesizing YAG was first reported in 1990's. Solvothermal synthesis is a technique in which the reaction occurs in a sealed vessel that allows certain solvents such to be heated to temperatures far in excess of their normal boiling points.

Solvothermal synthesis is a technique in which the reaction occurs in a pressure vessel that allows normal solvents such as water or alcohols to be heated to temperatures far in excess of their normal boiling points. Most solvothermal synthesis of YAG powder or glycothermal synthesis of $Ce^{3+}$-YAG involve the use of either 1,4-butanediol or in a mixture of 1,4-butanediol and polyethylene glycol (PEG), and the pressure can go up to 5.5 MPa. The 1,4-butanediol is a restricted solvent, therefore the cost is high and it's difficult to obtain. The workup process of the product colloidal solution is also time-consuming, requiring several washes before the precipitates can be recover. This further contributes to the inefficient and noneconomical large scale process.

An improved solvothermal method that not only allows the inner pressure to be preset as well as to be adjusted freely throughout the reaction, but also dramatically simplifies the work-up process with high recovery yield. In addition, a new solvent, 1,5-pentanediol, was used in place of conventional 1,4-butanediol which is now a highly restricted material. The present invention also makes nanometer sized YAG particles with high IQE value.

Figure 1:
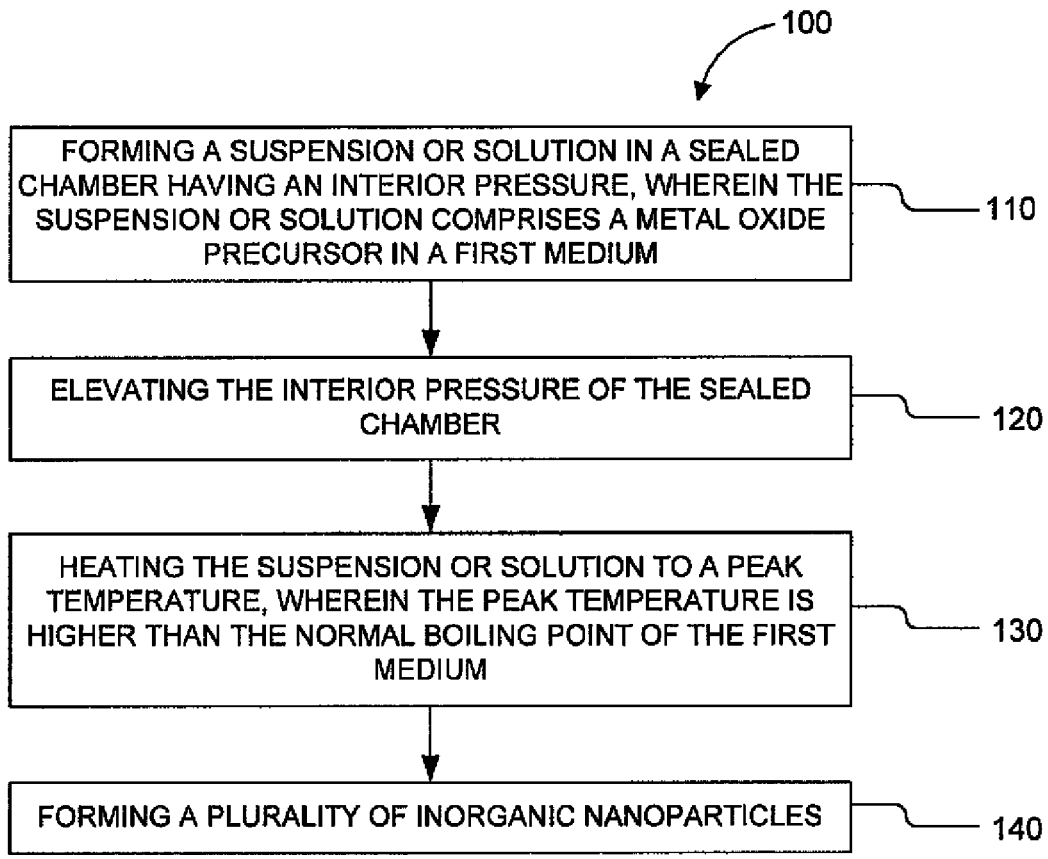
FIG. 1 is a schematic showing a solvothermal process for making inorganic nanoparticles.

Some embodiments provide a solvothermal process for making inorganic nanoparticles. With reference to FIG. 1, process 100 is a solvothermal process wherein inorganic nanoparticles may be made under relatively low temperature and elevated pressure conditions. Examples of inorganic nanoparticles that may be made by process 100 include, but not limited to, $Y_3Al_5O_{12}$:Ce, $BaAl_2O_4$:Eu, $MgAl_2O_4$:Eu, $SrTiO_3$:Pr, $Y_3Al_5O_{12}$:Eu, $Y_3Al_5O_{12}$:Tb, $Y_2O_3$:Eu, $Y_2O_3$:Ce, ZnO:Ga. The term "nanoparticles" includes all shapes of nano-sized materials, such as nanorods, nanowires, nanospheres, etc. The process 100 begins at step 110 by forming a suspension or solution comprising a metal oxide precursor in a first medium. In some embodiments, the metal oxide precursor may comprise a group II-IV and lanthanide metal inorganic salt (including but not limited to: aluminum isopropoxide, aluminum t-butoxide, aluminum ethoxide, aluminum lactate, aluminum oxide, aluminum nitrate, aluminum sulfate, aluminum phosphate, alumatrane, aluminum acetylacetonate, yttrium acetate, yttrium acetylacetonate, yttrium butoxide, yttrium isopropoxide, yttrium nitrate, yttrium oxide, yttrium phosphate, yttrium sulfate, cerium acetate, cerium acetylacetonate, cerium butoxide, cerium isopropoxide, cerium nitrate, cerium oxide, cerium phosphate, cerium sulfate, titanium oxide, zinc oxide, zirconium oxide). In some embodiments, the metal precursor may comprise at least one of the yttrium source, aluminum source, and cerium source. For example, aluminum isopropoxide, aluminum t-butoxide, aluminum ethoxide, aluminum lactate, aluminum oxide, aluminum nitrate, aluminum sulfate, aluminum phosphate, alumatrane, aluminum acetylacetonate, yttrium acetate, yttrium acetylacetonate, yttrium butoxide, yttrium isopropoxide, yttrium nitrate, yttrium oxide, yttrium phosphate, yttrium sulfate, cerium acetate, cerium acetylacetonate, cerium butoxide, cerium isopropoxide, cerium nitrate, cerium oxide, cerium phosphate, and cerium sulfate.

The first medium may comprise at least one low-molecular-weight alcohol. A low-molecular-weight alcohol typically weighs less than 500 u. In some embodiments, suitable metal oxide are suspended or dissolved in a low-molecular-weight alcohol. Examples of low-molecular-weight alcohol include, but not limited to, butanol, isopropanol, propanol, ethanol, methanol, 1,5-pentanediol, 1,4-butanediol, 1,3-propanediol, 1,2-propanediol, ethylene glycol. In some embodiments, the alcohol may include alkyl alcohol or substituted alkyl alcohol. In some embodiments, the low-molecular-weight alcohol may comprise low-molecular-weight glycol. The term "low-molecular-weight aliphatic glycol" refers to compounds containing non-aromatic carbons and two hydroxyl groups. In some embodiments, a mixture of water and at least one low-molecular-weight alcohol may also be used as the first medium.

The suspension or solution is disposed in a sealed chamber having an interior pressure. In some embodiments, the sealed chamber is a reaction vessel with an adjustable and/or controllable pressure. In some embodiments, the sealed chamber may be configured to have controllable or adjustable pressure by connecting a pressurized gas cylinder to the chamber. The pressurized gas cylinder may contain an inert gas (e.g., nitrogen, argon, $XeF_2$ or $XeF_4$, etc.) or air. A sealed chamber in gas communication with a pressurized gas or air source would allow the interior pressure (i.e., the pressure inside the sealed chamber) to be preset or adjusted throughout the reaction or heating process, thereby provide control over the experimental or reaction condition. In some embodiments, the sealed chamber may be an autoclave or any sealed vessel that can withstand an elevated pressure and/or elevated temperature to at least the highest pressure and the highest temperature to be reached in a particular reaction.

The process 100 continues to step 120 by elevating the interior pressure of the sealed chamber to an initial interior pressure that is higher than the atmospheric pressure. In other words, the initial interior pressure may be preset prior to the reaction taking place in the chamber, and may also be controlled or adjusted during and after the reaction. In some embodiments, the initial pressure inside the sealed chamber may be preset to an elevated pressure prior to heating the suspension or solution. The elevated pressure may be any pressure that is higher than the atmospheric pressure. In some embodiments, the initial pressure may be set to be between about 50 to about 600 psi (pounds per inch). In some embodiments, the initial pressure may also be about 100 to about 500 psi, about 200 to about 400 psi, about 250 to about 350 psi, or about 300 psi. In some embodiments, the initial pressure may be about 100 to about 3000 psi, about 100 to about 2500 psi, about 200 to about 2000 psi, about 300 to about 1500 psi, or about 400 to about 1000 psi.

The process 100 continues to step 130 by heating the suspension or solution in a sealed chamber to a peak temperature. The peak temperature is higher than the normal boiling point of the first medium. The normal boiling point of the first medium refers to the boiling point of the first medium under normal atmospheric pressure. In some embodiment, the peak or optimal temperature may be between about 100 to about 600° C., about 200 to about 400° C., about 250 to about 350° C., or about 300° C. In some embodiments, the heating process may comprise applying heat so that a certain temperature increment or step up is exerted on the suspension or solution. In some embodiments, the temperature increment or step up may be between, for example, about 1 to about 15° C./min, about 2 to about 10° C./min, or about 2 to about 8° C./min.

As the temperature inside the chamber increases during the reaction or the heating of suspension or solution, the interior pressure may also increase. In some embodiments, the interior pressure may also be maintained relatively constant by releasing the pressure buildup by venting or release the gas or air inside the chamber. In some embodiments, the interior pressure may also be adjusted so it does not reach an excessive pressure according to the reaction carried out in the sealed chamber. In some embodiments, additional inert gas or air may be introduced into the sealed chamber during or after the reaction to increase the interior pressure. In some embodiments, the final pressures reached inside of the sealed chamber may be between 100 to about 3,000 psi. In some embodiments, the final pressure can also be between 200 to about 2000 psi, about 300 to about 1000 psi, about 400 to about 900 psi, or about 500 to about 700 psi.

In some embodiments, once the peak or optimal temperature is reached, the reaction is maintained at the peak temperature for a period of time before allowing the suspension or solution to cool down to room temperature. In some embodiments, the interior pressure of the sealed chamber may also be maintained at a certain level. The period of time wherein the temperature and/or pressure is to be maintained may range from, for example, about 10 min to 24 hours, about 30 min to about 20 hours, about 1 to about 10 hours, and about 1 to about 5 hours.

The process 100 continues to step 140 by forming a plurality of inorganic nanoparticles from the cooled suspension, solution or colloidal solution. The inorganic nanoparticles may comprise nanotubes, nanowires, nanospheres, nanorods or any combination thereof. In some embodiments, the inorganic nanoparticles may comprise YAG. In some embodiments, the inorganic nanoparticles may also comprise $Ce^{3+}$-YAG powders. In some embodiments, a second medium may be used to facilitate the precipitation. In some embodiments, the nanoparticles are precipitated in the second medium. Examples of suitable second medium include, but not limited to, acetonitrile, propiononitrile, butyronitrile, acetone, butanone, pentanone, cyclopentanone, byclohexanone, ethanol, propanol, isopropanol, butanol, diethyl ether, and tetrahydrofuran. The collected nanoparticles may be dried in a vacuum oven or in air. In some embodiments, the dimension of the nanoparticles may be on the order of about 2 to about 200 nm, about 5 to about 150 nm, about 10 to about 100 nm, about 15 to about 75 nm, about 20 to about 50 nm or less than about 30 nm. In some embodiments, 80% of the plurality of inorganic nanoparticles has a diameter less than 200 nm, preferably less than 150 nm or less than 100 nm.

The solvothermal process is capable of providing a ceramic yield of over 60%, more preferably over 80%, and the YAG nanoparticles made by such process are capable of having an internal quantum efficiency of over 25%.

In some embodiments, an optical film that is capable of converting blue light to yellow light may be made using the YAG nanoparticles described above. The optical film may comprise a layer of YAG nanoparticles having a size distribution of between about 2 nm to about 200 nm. In some embodiments, the YAG nanoparticle size distribution may be about 10 nm to about 150 nm, about 20 nm to about 100 nm or about 30 nm to about 100 nm. In one embodiment, the layer of YAG nanoparticles may comprise cerium doped YAG phosphor.

Figure 2:
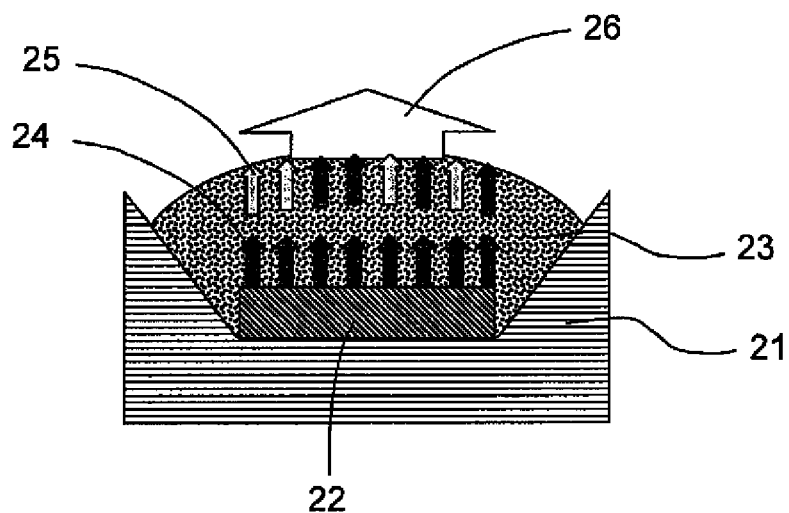
FIG. 2 is shows a schematic of a white light emitting device (LED) comprising a blue LED chip encapsulated by a $Ce^{3+}$-YAG phosphor.

Some embodiments also provide a light emitting device (LED) comprising cerium doped YAG phosphor. FIG. 2 shows a schematic of a LED comprising a blue LED chip 22 encapsulated by a $Ce^{3+}$-YAG phosphor 23. In some embodiments, the $Ce^{3+}$-YAG phosphor 23 comprises $Ce^{3+}$-YAG nanoparticles dispersed in an encapsulant resin. The $Ce^{3+}$-YAG phosphor is capable of absorbing a portion of blue light 24 emitted by the blue LED chip 22 and convert to yellow light 25. The yellow light 25 and a portion of blue light 24 not absorbed by the $Ce^{3+}$-YAG phosphor will result in white light emission 26. The $Ce^{3+}$-YAG phosphor of a conventional white LED may contain $Ce^{3+}$-YAG particle size greater then 1 μm. In this case, the emitted blue and yellow lights can be back scattered by the large particle size and result in the loss of emitted light or lowered emission. Utilizing the small nanoparticles made by the solvothermal process discussed herein would eliminate the back scattering and increase the overall light output or intensity.

In some embodiments, the optical film comprising YAG nanoparticles described above may also be incorporated in a LED, either stand alone or in combination with the $Ce^{3+}$-YAG phosphor to reduce back scattering of emitted light and to improve emission.

EXAMPLE

Aluminium isopropoxide (1.934 g, 9.47 mmol), yttrium (III) acetate tetrahydrate (1.903 g, 5.63 mmol), and cerium (III) acetate monohydrate (19 mg, 0.056 mmol) at Ce/(Y+Ce) =1.0 wt. % were suspended in a mixture of 1,5-pentanediol and water (30 ml, volume ratio=10/1) in a glass inner vessel. Then the vessel was placed in a 100 mL autoclave (additional solvent 1,5-pentanediol (2 mL) was poured into the gap between the autoclave wall and the glass vessel) and purged with Ar for 15 min. The autoclave was then pre-charged with $N_2$ to reach 300 psi, and heated to 300° C. at a rate of ~3° C./min with stirring at 300 rpm. During the heating, the interior pressure gradually increased so a combination of apply/release $N_2$ are to be applied to adjust the pressure to be about 600 psi. After heating at 300° C. and 600 psi for about 3 hours, the reaction was allowed to cool to room temperature. The yellowish colloidal solution was poured into acetonitrile (400 ml) under vigorous stirring, and allowed to settle down. After centrifuge, the collected solid was dried in vacuum oven at room temperature for overnight to obtain 1.2 g yellowish powder.

Figure 3:
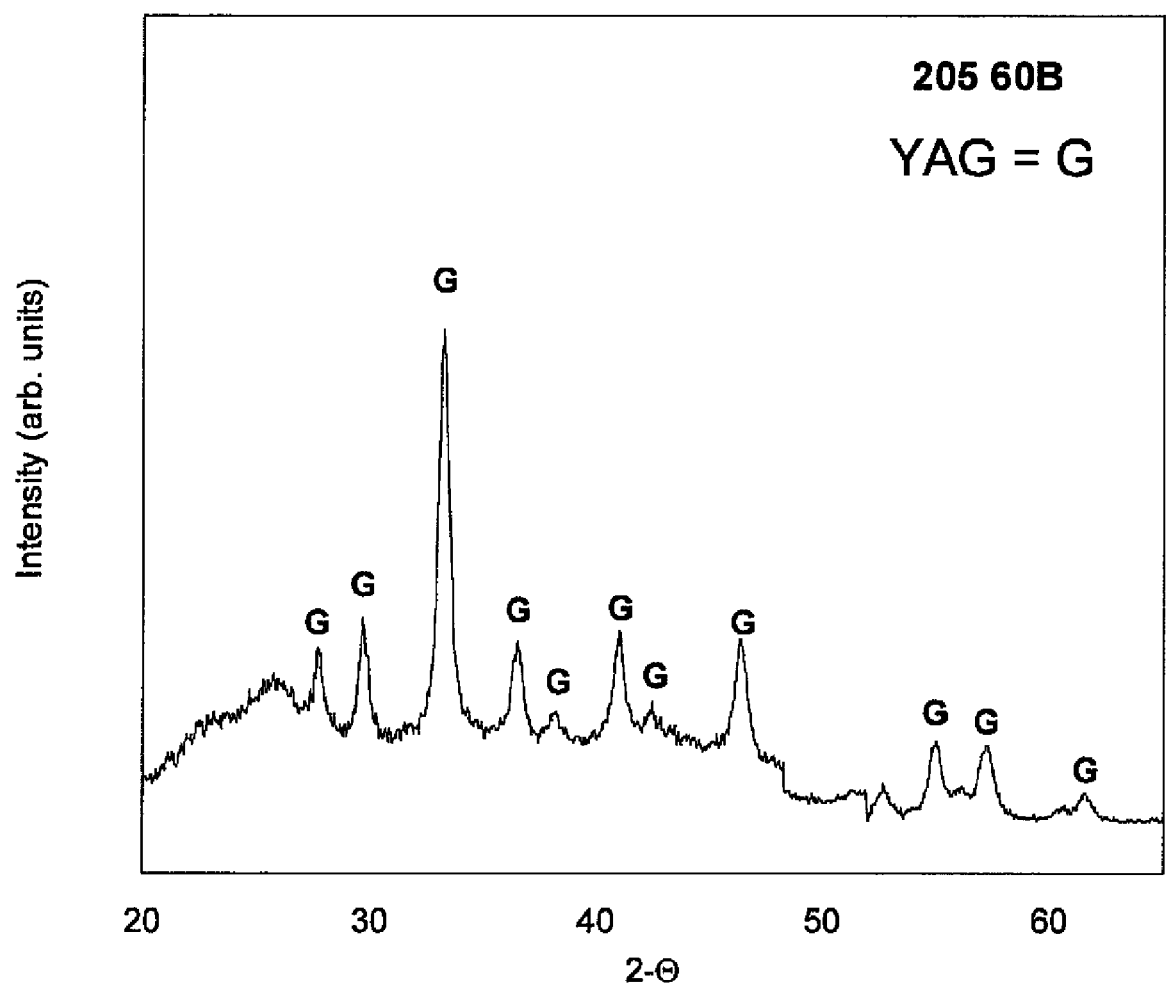
FIG. 3 is an X-ray diffraction spectrum of YAG nanoparticles made by the solvothermal process.
Figure 4:
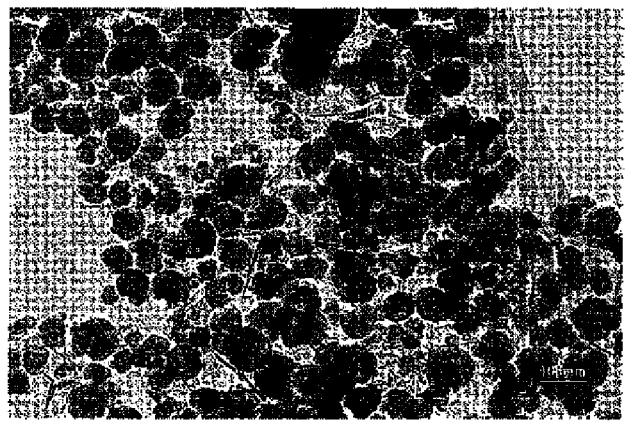
FIG. 4 shows the TEM micrograph of the YAG nanoparticles made by the solvothermal process.

X-ray diffraction spectrum of YAG nanoparticles is shown in FIG. 3. The TEM micrograph of the YAG nanoparticles is shown in FIG. 4. Internal quantum efficiency (IQE) is about 37.9%.

What is claimed is:

1. A solvothermal process for making yttrium aluminum garnet (YAG) nanoparticles, comprising:

forming a suspension or solution comprising at least one yttrium source and at least one aluminum source in a first medium;

disposing the suspension or solution in a sealed chamber having an initial interior pressure prior to heating that is higher than the atmospheric pressure;

heating the suspension or solution in the sealed chamber to a peak temperature higher than the normal boiling point of the first medium; and precipitating the YAG nanoparticles.

2. The solvothermal process of claim 1, further comprising adding a second medium to the suspension or solution after the heating.

3. The solvothermal process of claim 2, wherein the second medium comprises acetonitrile.

4. The solvothermal process of claim 1, further comprising adjusting the interior pressure of the sealed chamber after the heating begins.

5. The solvothermal process of claim 1, wherein the suspension or solution in the sealed chamber is under a nitrogen atmosphere.

6. The solvothermal process of claim 1, wherein the initial interior pressure is between about 100 to about 2500 psi.

7. The solvothermal process of claim 1, wherein the peak temperature is between about 100 to about 600° C.

8. The solvothermal process of claim 1, wherein the at least one group II-IV and lanthanide metal inorganic salt comprises a yttrium source, an aluminum source and a cerium source.

9. The solvothermal process of claim 1, wherein the at least one group II-IV and lanthanide metal inorganic salt is selected from aluminum isopropoxide, aluminum t-butoxide, aluminum ethoxide, aluminum lactate, aluminum oxide, aluminum nitrate, aluminum sulfate, aluminum phosphate, alumatrane, aluminum acetylacetonate, yttrium acetate, yttrium acetylacetonate, yttrium butoxide, yttrium isopropoxide, yttrium nitrate, yttrium oxide, yttrium phosphate, yttrium sulfate, cerium acetate, cerium acetylacetonate, cerium butoxide, cerium isopropoxide, cerium nitrate, cerium oxide, cerium phosphate, cerium sulfate, titanium oxide, zinc oxide, and zirconium oxide.

10. The solvothermal process of claim 1, wherein the first medium comprises at least one alcohol having molecular weight of less than 500.

11. The solvothermal process of claim 10, wherein the at least one alcohol having molecular weight of less than 500 comprises an aliphatic glycol.

12. The solvothermal process of claim 10, wherein the at least one alcohol having molecular weight of less than 500 comprises 1,5-pentanediol.

13. The solvothermal process of claim 1, wherein the plurality of inorganic nanoparticles comprises rare-earth doped yttrium aluminum garnet (YAG) nanoparticles.

14. A solvothermal process for making yttrium aluminum garnet (YAG) nanoparticles, comprising:

forming a suspension or solution comprising a at least one group II-IV and lanthanide metal inorganic salt in a first medium;

disposing the suspension or solution in a sealed chamber having an initial interior pressure prior to heating that is higher than the atmospheric pressure;

heating the suspension or solution in the sealed chamber to a peak temperature higher than the normal boiling point of the first medium; and precipitating the YAG nanoparticles.

15. The solvothermal process of claim 14, wherein the precipitating occurs in a second medium.

16. The solvothermal process of claim 15, wherein the second medium comprises acetonitrile.

17. The solvothermal process of claim 14, further comprising reaching a peak interior pressure of between about 100 to about 3000 psi after the sealed chamber reaches the peak temperature.

18. The solvothermal process of claim 14, wherein the suspension or solute in the sealed chamber is under a nitrogen atmosphere.

19. The solvothermal process of claim 14, wherein the initial interior pressure is between about 50 to about 600 psi.

20. The solvothermal process of claim 14, wherein the suspension or solution further comprises at least one cerium source.

21. The solvothermal process of claim 20, wherein the at least one yttrium source, at least one aluminum source, and at least one cerium source selected from aluminum isopropoxide, aluminum t-butoxide, aluminum ethoxide, aluminum lactate, aluminum oxide, aluminum nitrate, aluminum sulfate, aluminum phosphate, alumatrane, aluminum acetylacetonate, yttrium acetate, yttrium acetylacetonate, yttrium butoxide, yttrium isopropoxide, yttrium nitrate, yttrium oxide, yttrium phosphate, yttrium sulfate, cerium acetate, cerium acetylacetonate, cerium butoxide, cerium isopropoxide, cerium nitrate, cerium oxide, cerium phosphate, cerium sulfate, titanium oxide, zinc oxide, and zirconium oxide.

22. The solvothermal process of claim 14, wherein the first medium comprises at least one alcohol having molecular weight of less than 500.

23. The solvothermal process of claim 22, wherein the at least one alcohol having molecular weight of less than 500 comprises an aliphatic glycol.

24. The solvothermal process of claim 22, wherein the at least one alcohol having molecular weight of less than 500 comprises 1,5-pentanediol.

25. The solvothermal process of claim 14 having a ceramic yield of over 80%.

26. The solvothermal process of claim 14, wherein the YAG nanoparticles have an internal quantum efficiency of over 25%.

27. The solvothermal process of claim 14, wherein the YAG nanoparticles is crystalline.

28. The solvothermal process of claim 14, wherein the YAG nanoparticles have a diameter of about 2 to about 200 nm.

* * * * *

UNITED STATES PATENT AND TRADEMARK OFFICE
CERTIFICATE OF CORRECTION

PATENT NO. : 7,959,885 B2  
APPLICATION NO. : 12/032590  
DATED : June 14, 2011  
INVENTOR(S) : Li et al.

Page 1 of 2

It is certified that error appears in the above-identified patent and that said Letters Patent is hereby corrected as shown below:

Page 1 (item 56), at column 2, line 11, Under Other Publications, change "$Y_3AI_5O_{12}$" to --$Y_3Al_5O_{12}$--.

Page 1 (item 56), at column 2, line 11, Under Other Publications, change "$Y_3AI_5O_{12}$ via" to --$Y_3Al_5O_{12}$ via--.

Page 1 (item 56), at column 2, line 16, Under Other Publications, change "$MgAI_2O_4$ and $Y_3AI_5O_{12}$" to --$MgAl_2O_4$ and $Y_3Al_5O_{12}$--.

Page 2 (item 56), at column 1, line 3, Under Other Publications, change "$Y_3AI_5O_{12}$:Tb"," to --$Y_3Al_5O_{12}$:Tb",--.

Page 2 (item 56), at column 1, line 5, Under Other Publications, change "$Y_3AI_5O_{12}$" to --$Y_3Al_5O_{12}$--.

Page 2 (item 56), at column 1, line 15, Under Other Publications, change "$Y_3AI_5O_{12}$" to --$Y_3Al_5O_{12}$--.

Page 2 (item 56), at column 1, line 19, Under Other Publications, change "$Y_3AI_5O_{12}$" to --$Y_3Al_5O_{12}$"--.

Page 2 (item 56), at column 2, line 28, Under Other Publications, change "$Y_3AI_5O_{12}$," to --$Y_3Al_5O_{12}$,--.

In Claim 1, at column 6, lines 66-67 to column 7, lines 1-10, please delete the entire text of Claim 1, "A solvothermal process for making yttrium aluminum garnet (YAG) nanoparticles, comprising:
    forming a suspension or solution comprising at least one yttrium source and at least one aluminum source in a first medium;
    disposing the suspension or solution in a sealed chamber having an initial interior pressure prior to heating that is higher than the atmospheric pressure;
    heating the suspension or solution in the sealed chamber to a peak temperature higher than the normal boiling point of the first medium; and
    precipitating the YAG nanoparticles."
and insert therefore, --A solvothermal process for making inorganic nanoparticles, comprising:

Signed and Sealed this  
Eleventh Day of September, 2012

David J. Kappos  
*Director of the United States Patent and Trademark Office*

CERTIFICATE OF CORRECTION (continued)
U.S. Pat. No. 7,959,885 B2 forming a suspension or solution comprising at least one group II-IV and lanthanide metal inorganic salt in a first medium;

disposing the suspension or solution in a sealed chamber having an interior pressure;

heating the suspension or solution to a peak temperature higher than the normal boiling point of the first medium;

elevating the interior pressure of the sealed chamber to an initial interior pressure prior to the heating; and forming a plurality of inorganic nanoparticles, wherein 80% of the plurality of inorganic nanoparticles has a diameter less than 100 nm.--.

In Claim 14, at column 7, lines 56-58, please delete "forming a suspension or solution comprising a at least one group II-IV and lanthanide metal inorganic salt in a first medium;" and insert therefore, --forming a suspension or solution comprising at least one yttrium source and at least one aluminum source in a first medium;--.